United States Patent [19]

Sayles

[11] Patent Number: 5,732,974
[45] Date of Patent: Mar. 31, 1998

[54] SEAT BELT SYSTEM ENERGY MANAGEMENT DEVICE REPLACEMENT INDICATOR

[75] Inventor: Robert D. Sayles, Rochester, Mich.

[73] Assignee: TRW Vehicle Safety Systems Inc., Lyndhurst, Ohio

[21] Appl. No.: 807,976

[22] Filed: Mar. 3, 1997

[51] Int. Cl.$^6$ .................................................. B60R 22/20
[52] U.S. Cl. ............................ 280/805; 280/808; 297/470
[58] Field of Search .................................. 280/805, 801.1, 280/808; 297/470, 468, 483, 486

[56] References Cited

U.S. PATENT DOCUMENTS

| | | | |
|---|---|---|---|
| 3,482,872 | 12/1969 | Chamberlin | 297/472 |
| 3,811,702 | 5/1974 | Kurasawa et al. | 280/808 |
| 3,975,258 | 8/1976 | Fox | 280/805 X |
| 4,702,492 | 10/1987 | Andres et al. | 280/801.1 |
| 5,069,482 | 12/1991 | Fohl | 280/801.1 |
| 5,286,058 | 2/1994 | Wier | 280/808 |
| 5,566,978 | 10/1996 | Fleming et al. | 280/801.2 |

FOREIGN PATENT DOCUMENTS

| | | | |
|---|---|---|---|
| 568327 | 11/1993 | European Pat. Off. | 280/805 |
| 1339401 | 11/1962 | France | 280/805 |

*Primary Examiner*—Christopher P. Ellis
*Attorney, Agent, or Firm*—Tarolli, Sundheim, Covell, Tummino & Szabo

[57] ABSTRACT

A vehicle seat belt system (10) includes a length of seat belt webbing (14). An energy absorber (32) connected with the belt webbing (14) is actuatable in response to the tensile load on the belt webbing exceeding a predetermined load. The system (10) includes a D-ring (24) having a webbing opening (46) through which the belt webbing (14) extends. The D-ring (24) is supported for movement from a first position to a second position upon actuation of the energy absorber (32). A signalling mechanism (40, 72) is actuatable in response to movement of the D-ring (24) from the first position to the second position for providing a signal perceptible to the vehicle occupant and indicative of actuation of the energy absorber (32). In a preferred embodiment, the signalling mechanism (40, 72) includes an electric switch (40) which is actuated in response to movement of the D-ring (24) from the first position to the second position, and a lamp (72) which is energized in response to the actuation of the electric switch.

16 Claims, 6 Drawing Sheets

U.S. Patent    Mar. 31, 1998    Sheet 1 of 6    5,732,974
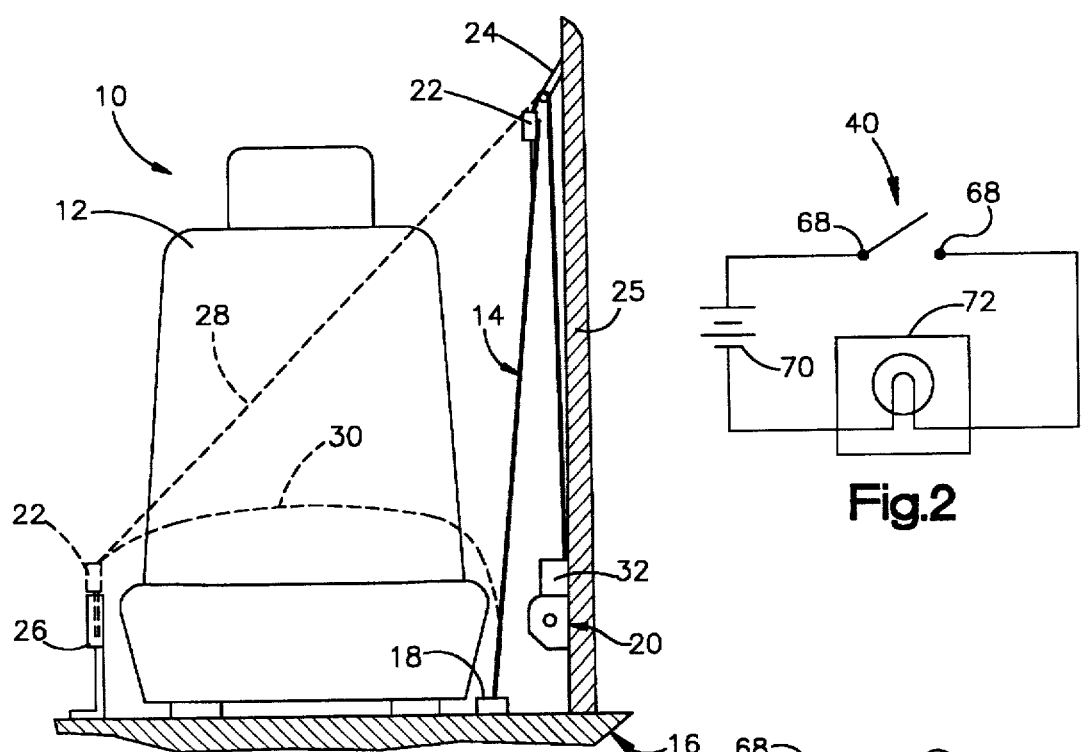
Fig.1
Fig.2
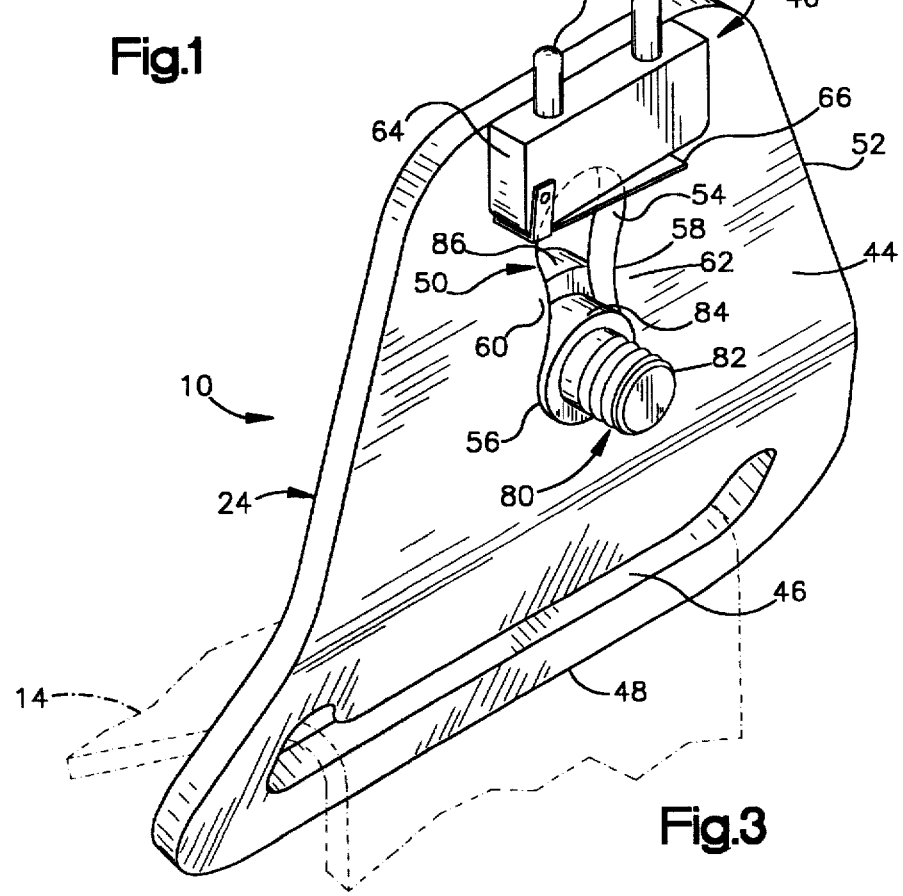
Fig.3

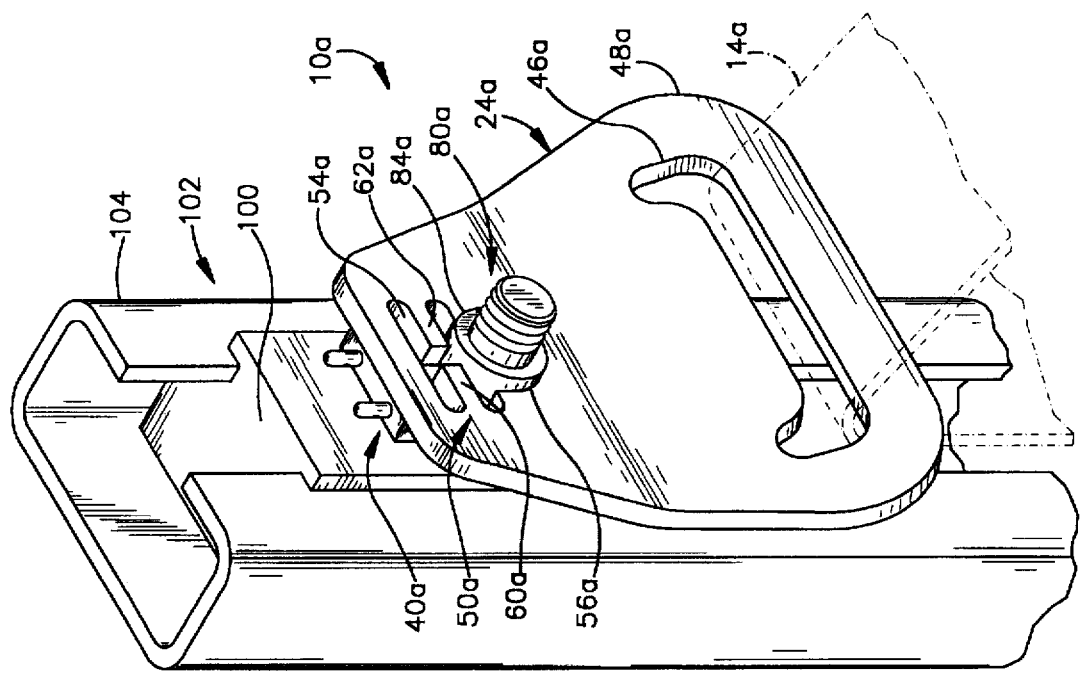
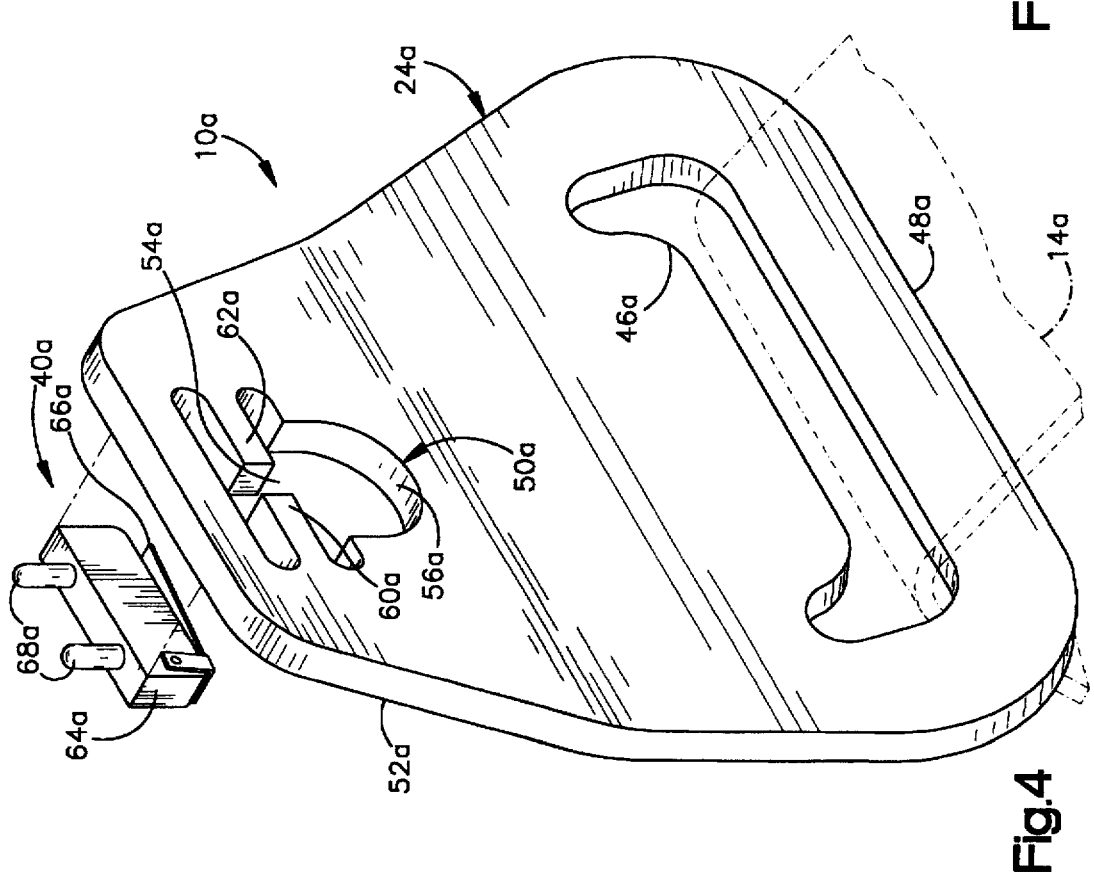

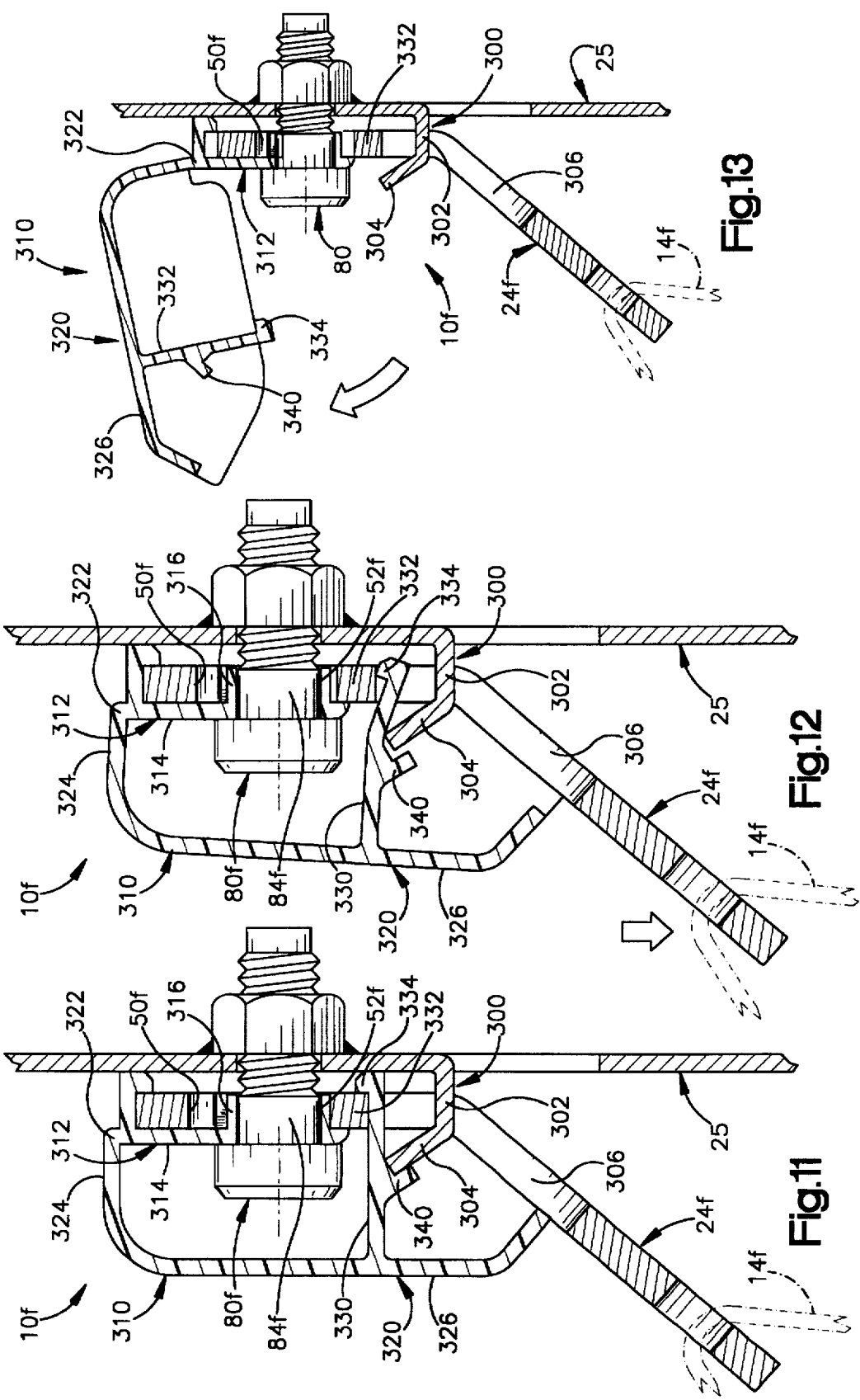

SEAT BELT SYSTEM ENERGY MANAGEMENT DEVICE REPLACEMENT INDICATOR

BACKGROUND OF THE INVENTION

1. Technical Field

The present invention relates to a vehicle seat belt system including an energy management device, such as an energy absorber. The present invention particularly relates to a vehicle seat belt system including an apparatus for providing a perceptible signal indicative of actuation of the energy absorber.

2. Description of the Prior Art

A typical vehicle seat belt system includes a length of seat belt webbing wound on a spool of a lockable seat belt webbing retractor. The belt webbing is extensible about a vehicle occupant to restrain the occupant.

It is known to include an energy management device, such as an energy absorber, in a seat belt system. In the event of sudden vehicle deceleration, such as occurs in a vehicle collision, the retractor locks and the force of the forward moving vehicle occupant loads the seat belt webbing. This force is transmitted through the seat belt webbing to the energy absorber, which helps to minimize the shock load on the vehicle occupant.

In some seat belt systems, the energy absorber needs to be repaired or replaced after actuation. It is desirable that the vehicle occupant be made aware of the actuation of the energy absorber, at the time of the event, so that repair or replacement of the energy absorber can be made if necessary.

SUMMARY OF THE INVENTION

The present invention is a vehicle occupant safety apparatus comprising a length of seat belt webbing extensible about a vehicle occupant for helping to restrain the vehicle occupant. An energy absorber connected with the belt webbing is actuatable in response to the tensile load on the belt webbing exceeding a predetermined load indicative of a vehicle collision. The safety apparatus includes a D-ring having a webbing opening through which the belt webbing extends, and means for supporting the D-ring for movement from a first position to a second position upon actuation of the energy absorber. The safety apparatus also includes signalling means actuatable in response to movement of the D-ring from the first position to the second position for providing a signal perceptible to the vehicle occupant and indicative of actuation of the energy absorber.

In a preferred embodiment, the signalling means comprises an electric circuit including an electric switch which is actuated in response to movement of the D-ring from the first position to the second position, and a signal device which is energized in response to the actuation of the electric switch to provide the signal perceptible to the vehicle occupant.

BRIEF DESCRIPTION OF THE DRAWINGS

Further features of the present invention will become apparent to one skilled in the art to which the present invention relates from reading the following specification with reference to the accompanying drawings, in which:

FIG. 1 is a schematic illustration of a vehicle seat belt system constructed in accordance with the present invention and including an energy absorber;

FIG. 2 is a schematic diagram of vehicle electric circuitry including a lamp for visually indicating actuation of the energy absorber of the seat belt system of FIG. 1;

FIG. 3 is an enlarged perspective view of a D-ring included in the seat belt system of FIG. 1 which is movable to cause actuation of the indicator lamp of FIG. 2;

FIG. 4 is an exploded perspective view of a movable D-ring constructed in accordance with a second embodiment of the present invention;

FIG. 5 is a perspective view showing the D-ring of FIG. 4 mounted on a height adjuster;

FIG. 11 is a sectional view of a movable D-ring constructed in accordance with a seventh embodiment of the present invention, shown in a first condition;

FIG. 12 is a view showing the D-ring of FIG. 11 in a second condition; and

FIG. 13 is a view showing the D-ring of FIG. 11 in a third condition.

DESCRIPTION OF PREFERRED EMBODIMENTS

Figure 7:
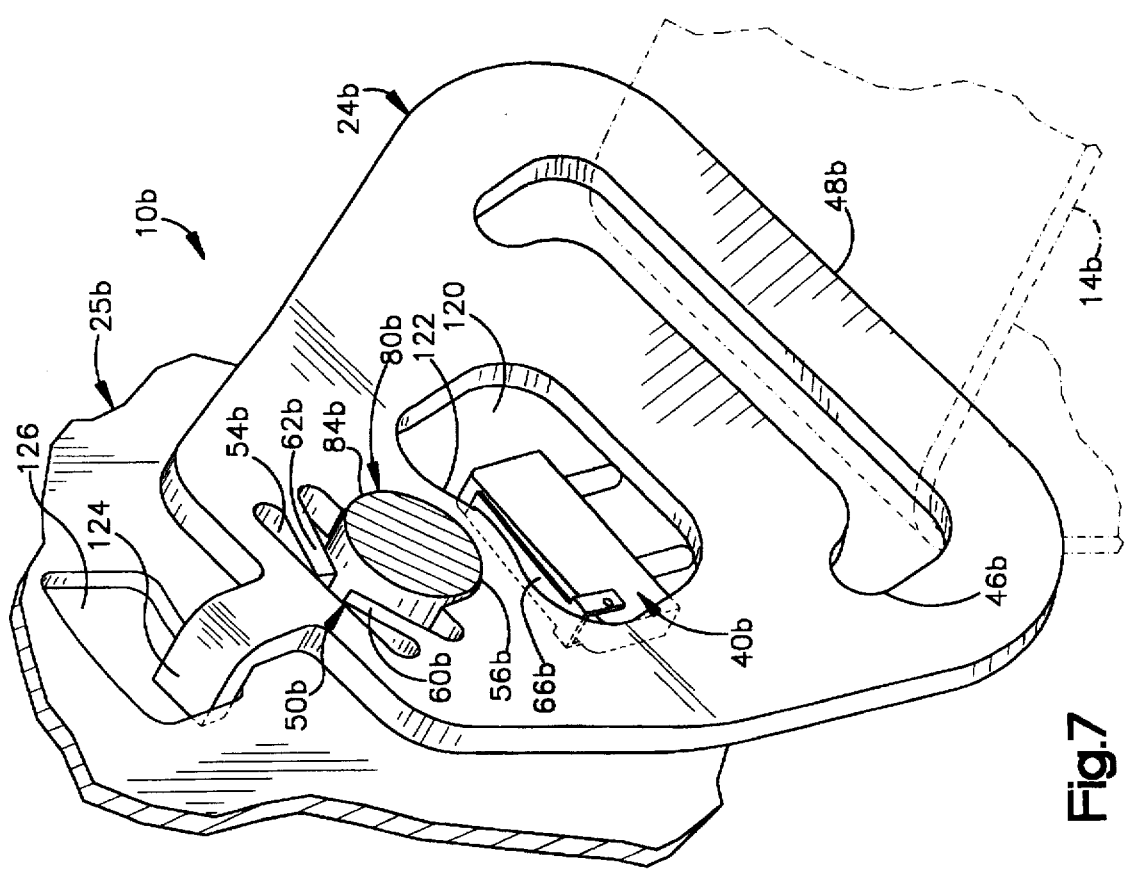
FIG. 7 is a view showing the D-ring of FIG. 6 in a second condition.

The present invention relates to a vehicle seat belt system including an energy management device, such as an energy absorber. The present invention particularly relates to a vehicle seat belt system including an apparatus for providing a perceptible signal indicative of actuation of the energy absorber. As representative of the present invention, FIG. 1 illustrates a three-point continuous loop seat belt system 10 for use in restraining an occupant of a vehicle.

During operation of the vehicle, the occupant of the vehicle sits on a seat 12 which is illustrated as the driver's seat in the vehicle. A length of seat belt webbing 14 is extensible about the vehicle occupant. One end of the length of belt webbing 14 is anchored to the vehicle body 16 at an anchor point 18 located on one side of the seat 12. The opposite end of the belt webbing 14 is attached to a retractor 20 which is secured to the vehicle body on the same side of the seat 12. Intermediate its ends, the belt webbing 14 passes through a tongue assembly 22 and a D-ring 24 that is located above the retractor 20 and the anchor point 18. The D-ring 24, illustrated schematically in FIG. 1, is supported on the B-pillar 25 of the vehicle. When the seat belt system 10 is not in use, the belt webbing 14 is wound on the retractor 20 and is oriented generally vertically on the one side of the seat 12, as shown in solid lines in FIG. 1.

To engage the seat belt system 10, the tongue assembly 22 is manually grasped and is pulled across the lap and torso of the occupant sitting in the seat 12. As the tongue assembly 22 is pulled across the lap and torso of the occupant, the tongue assembly moves along the belt webbing 14, and the belt webbing is unwound from the retractor 20. When the belt webbing 14 has been pulled across the lap and torso of the occupant, the tongue assembly 22 is connected with a buckle 26, as shown in dashed lines in FIG. 1. The buckle 26 is connected to the vehicle body 16 and is disposed on the side of the seat 12 opposite the anchor point 18. When the seat belt system 10 is thus buckled, the length of belt webbing 14 is divided by the tongue assembly 22 into a torso portion 28 which extends across the torso of the occupant and a lap portion 30 which extends across the lap of the occupant.

The seat belt system 10 includes a known energy management device, such as an energy absorber, indicated schematically at 32. The energy absorber 32 is associated in a force-transmitting relationship with the belt webbing 14. The energy absorber could, as is known, be located at one of many different load points in the seat belt system, such as at (or as a part of) the retractor 20, the anchor point 18, or the buckle 26. In a preferred embodiment, the energy absorber 32 is associated with the retractor 20 so that the retractor 20 moves under predetermined load.

In the event of sudden vehicle deceleration, a locking mechanism in the retractor 20 is actuated to block withdrawal of belt webbing 14 from the retractor. The force of the forward moving vehicle occupant loads the seat belt webbing 14. This force is transmitted through the seat belt webbing 14 to the energy absorber 32. The energy absorber 32 is actuated and helps to minimize the shock load on the vehicle occupant.

The seat belt system 10 includes a mechanism for providing a visual indication that the energy absorber 32 has been actuated. The mechanism includes the D-ring 24 and a switch 40 (FIGS. 2 and 3) mounted on the D-ring.

The D-ring 24 (FIG. 3) is preferably made from metal and has an outer major side surface 44 and an opposite inner major side surface. The outer side surface 44 of the D-ring 24 is presented away from the passenger compartment of the vehicle, that is, in a direction to the right as viewed in FIG. 1, when the D-ring is in the position shown in FIG. 1.

A webbing guide slot 46 extends through a lower end portion 48 of the D-ring 24. The belt webbing 14 extends through the guide slot 46. The lower end portion 48 of the D-ring 24 preferably has a plastic covering (not shown) which helps the belt webbing 14 to slide freely through the guide slot 46.

A mounting slot 50 extends through an upper end portion 52 of the D-ring 24. The mounting slot 50 has a keyhole-shaped, or figure-eight, configuration including generally circular, upper and lower end portions 54 and 56. A relatively narrow neck portion 58 of the mounting slot 50 extends between and interconnects the upper and lower end portions 54 and 56 of the mounting slot. The neck portion 58 of the mounting slot 50 is defined on opposite sides by spaced apart blocking portions 60 and 62 of the D-ring 24.

The switch 40 is mounted on the outer side surface 44 of the D-ring 24, at a location above the mounting slot 50 in the D-ring. The switch 40 is fixed for movement with the D-ring 24. The switch 40 has a body portion 64 which includes internal electrical contacts (not shown). An actuating arm 66 is supported on the body portion 64 of the switch 40 for pivotal movement relative to the body portion of the switch. The actuating arm 66 is located at the upper end portion 54 of the mounting slot 50 in the D-ring.

External terminals 68 of the switch 40 are electrically connected with the internal contacts of the switch. The terminals 68 project from the body portion 64 of the switch 40 in a direction away from the mounting slot 50. The terminals 68 are electrically connected with vehicle electric circuitry illustrated schematically in FIG. 2. The vehicle electric circuitry includes a power source 70, such as the vehicle battery, and an indicator 72. The indicator 72 is preferably a lamp mounted on a portion of the vehicle 18 such as the instrument panel of the vehicle in a position immediately perceptible to a vehicle occupant. The indicator 72 could, alternatively, be a device which provides an audible signal in addition to, or instead of, a visual signal.

The D-ring 24 is supported on the vehicle B-pillar 25 (not shown in FIG. 3) by a mounting bolt 80. The bolt 80 has a threaded outer end portion 82 for connection with the B-pillar 25, a cylindrical central portion 84, and an inner end portion 86.

The central portion 84 of the bolt 80 is disposed in the lower end portion 56 of the mounting slot 50 in the D-ring 24. The central portion 84 of the bolt 80 has an outer diameter approximately equal to the inner diameter of the lower end portion 56 of the mounting slot 50. The width of the neck portion 58 of the mounting slot 50 is less than the diameter of the central portion 84 of the mounting bolt 80. As a result, the blocking portions 60 and 62 of the D-ring 24, located on opposite sides of the neck portion 58 of the mounting slot 50, resist movement of the central portion 84 of the bolt 80 out of the lower end portion 56 of the mounting slot in the D-ring.

The blocking portions 60 and 62 of the D-ring 24 are deformable, under a predetermined load, to enable the central portion 84 of the bolt 80 to move out of the lower end portion 56 of the mounting slot 50 in the D-ring. This predetermined load is experienced at the design load of the energy absorber 32. Specifically, when the locking mechanism in the retractor 20 is actuated to block withdrawal of belt webbing 14 from the retractor, forward movement of the vehicle occupant relative to the seat 12 causes the vehicle occupant to engage the belt webbing 14. The force of the forward moving vehicle occupant loads the belt webbing 14. This force is transmitted through the seat belt webbing 14 to the energy absorber 32. Under a predetermined load, such as occurs in a vehicle collision, the energy absorber 32 is actuated, or operated, and helps to minimize the shock load on the vehicle occupant.

The force of the forward moving vehicle occupant is also transmitted through the belt webbing 14 to the D-ring 24. The D-ring 24 moves relative to the mounting bolt 80 upon application to the energy absorber 32 of the predetermined load which is sufficient to cause operation of the energy absorber. Specifically, the load from the belt webbing 14 is transmitted through the lower end portion 48 of the D-ring 24 to the upper end portion 52 of the D-ring. The force on the upper end portion 52 of the D-ring 24 urges the D-ring to move downward. The blocking portions 60 and 62 of the D-ring 24 deform and move away from each other. The D-ring 24 moves downward relative to the mounting bolt 80° The bolt 80 moves from a position in the lower end portion 56 of the mounting slot 50, through the neck portion 58 of the mounting slot, to a position in the upper end portion 54 of the mounting slot.

The switch 40 moves with the D-ring 24, relative to the bolt 80. When the D-ring 24 has moved down sufficiently that the bolt 80 is in the upper end portion 54 of the mounting slot 50, the actuating arm 66 on the switch 40 engages the bolt. The actuating arm 66 of the switch 40 pivots relative to the body portion 64 of the switch. The internal contacts in the switch 40 are actuated and the switch closes. The closing of the switch 40 completes the electric circuit illustrated in FIG. 2. The indicator lamp 72 is energized and provides a visual signal, or indication, that repair or replacement of the energy absorber 32 may be necessary. The signal is immediately perceptible to the vehicle occupant.

FIGS. 4 and 5 illustrate portions of a vehicle seat belt system 10a which is generally similar to the system 10 (FIGS. 1-3). The system 10a differs from the system 10, as described below, by incorporating a height adjuster mechanism and by providing a D-ring mounting slot having a different configuration. Parts of the seat belt system 10a which are identical or similar to corresponding parts of the seat belt system 10 are given the same reference numeral with the suffix "a" added for clarity. Parts of the seat belt system 10a which are not shown are identical to corresponding parts of the seat belt system 10.

In the seat belt system 10a, the mounting slot 50a in the D-ring 24a has a generally circular lower end portion 56a. A pair of spaced apart cantilevered arms 60a and 62a extend into an upper end portion 54a of the mounting slot 50a to provide the upper end portion 54a with an H-shaped configuration.

The D-ring 24a is supported on a mounting bolt 80a. The bolt 80a is fixed for movement with a movable portion, indicated schematically at 100, of a known D-ring height adjuster mechanism 102. The movable portion 100 of the height adjuster mechanism 102 is slidable in a C-shaped track 104 of the height adjuster mechanism. The track 104 is fixed to the vehicle B-pillar 25 (not shown in FIGS. 4 and 5) in a known manner.

The cylindrical central portion 84a of the mounting bolt 80a is disposed in the lower end portion 56a of the mounting slot 50a in the D-ring 24a. The central portion 84a of the bolt 80a has an outer diameter approximately equal to the inner diameter of the lower end portion 56a of the mounting slot 50a. The cantilevered arms 60a and 62a of the D-ring 24a engage the mounting bolt 80a and resist movement of the central portion 84a of the bolt out of the lower end portion 56a of the mounting slot 50a in the D-ring.

The switch 40a is secured, in a manner not shown, to the outer side surface of the D-ring 24a, at a location above the mounting slot 50a in the D-ring. The switch 40a is fixed for movement with the D-ring 24a. The actuating arm 66a of the switch 40a is disposed just above the central portion 84a of the bolt 80a when the D-ring 24a is mounted to the height adjuster mechanism 102 as shown in FIG. 5.

The cantilevered arms 60a and 62a of the D-ring 24a are deformable, under a predetermined load, to enable the central portion 84a of the bolt 80a to move out of the lower end portion 56a of the mounting slot 50a in the D-ring 24a. This load is experienced at the design load of the energy absorber 32a of the seat belt system 10a. When the energy absorber 32a is actuated, the force of the forward moving vehicle occupant is also transmitted through the belt webbing 14a to the D-ring 24a. The D-ring 24a moves relative to the mounting bolt 80a upon application to the energy absorber 32a of a load sufficient to cause operation of the energy absorber.

Specifically, the load from the belt webbing 14a is transmitted through the lower end portion 48a of the D-ring 24a to the upper end portion 52a of the D-ring. The D-ring 24a is urged to move downward under the applied load. The arms 60 and 62a of the D-ring 24a deform by bending upward as viewed in FIGS. 4 and 5, as the D-ring moves downward relative to the mounting bolt 80a. The bolt 80a moves into the upper end portion 54a of the mounting slot 50a.

The switch 40a moves with the D-ring 24a relative to the bolt 80a. The actuating arm 66a on the switch 40a engages the bolt 80a. The switch 40a closes, completing the electric circuit illustrated in FIG. 2. The indicator lamp 72 is energized and provides an immediately perceptible visual signal, or indication, that repair or replacement of the energy absorber 30a may be necessary.

Figure 6:
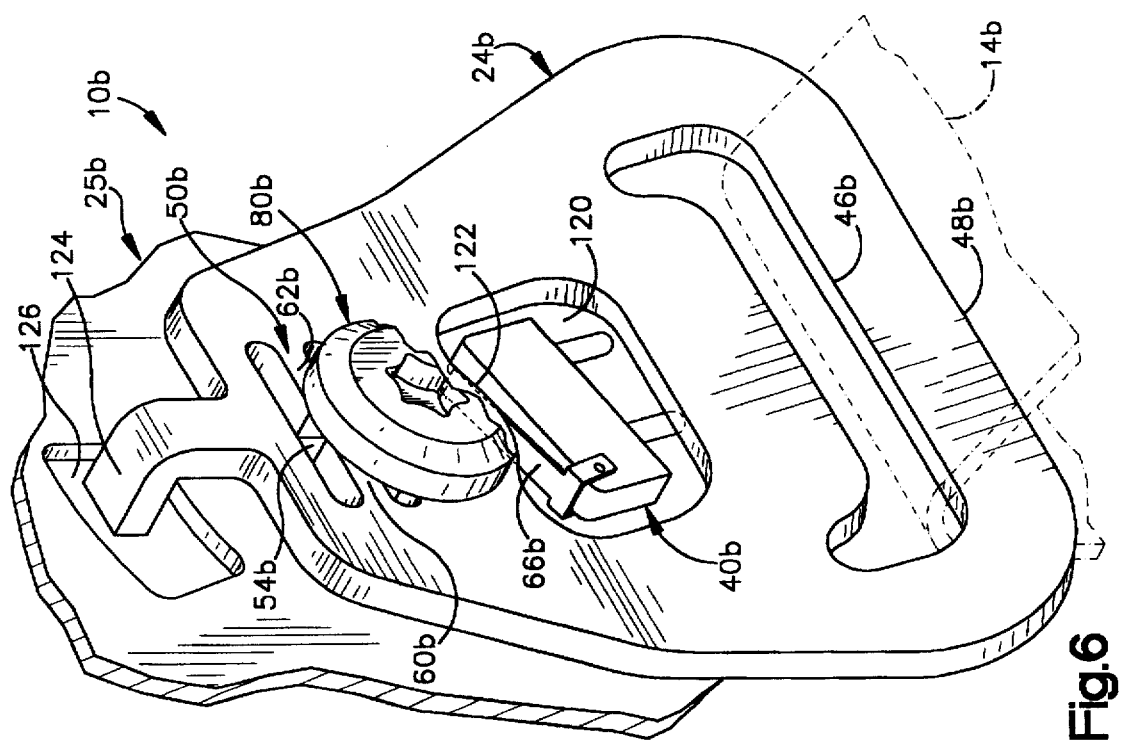
FIG. 6 is a perspective view, partially broken away, of a movable D-ring constructed in accordance with a third embodiment of the present invention, shown in a first condition.

FIGS. 6 and 7 illustrate portions of a vehicle seat belt system 10b. Parts of the seat belt system 10b which are identical or similar to corresponding parts of the seat belt system 10 are given the same reference numeral with the suffix "b" added for clarity. Parts of the seat belt system 10b which are not shown are identical to corresponding parts of the seat belt system 10.

The seat belt system 10b includes a D-ring 24b which is generally similar to the D-ring 24 (FIGS. 2 and 3). The D-ring 24b has a mounting slot 50b which is similar to the mounting slot 50a in the D-ring 24a (FIGS. 4 and 5). The seat belt system 10b includes a switch 40b fixed to the vehicle B-pillar 25b. In the seat belt system 10b, a generally rectangular switch opening 120 is formed in the D-ring 24b at a location between the webbing guide slot 46b and the mounting slot 50b. The switch opening 120 is partially defined by an actuator surface 122 which faces downward on the D-ring 24b.

The D-ring 24b is supported on a mounting bolt 80b fixedly secured to the vehicle B-pillar 25b. The cylindrical central portion 84b of the mounting bolt 80b is disposed in the lower end portion 56b of the mounting slot 50b in the D-ring 24b.

The switch 40b is mounted on the B-pillar 25b at a location adjacent to the switch opening 120 in the D-ring 24b. The switch 40b is supported on the B-pillar 25b in a known manner (not shown) for limited vertical movement relative to the B-pillar. The actuating arm 66b of the switch 40b is disposed just below the actuator surface 122 of the D-ring 24b. A tab 124 on the D-ring 24b is received in an opening 126 in the B-pillar 25b to limit rotational movement of the D-ring relative to the switch 40b.

The cantilevered arms 60b and 62b of the D-ring 24b engage the mounting bolt 80b and resist movement of the central portion 84b of the bolt out of the lower end portion 56b of the mounting slot 50b in the D-ring. When the energy absorber 32 of the system 10b is actuated, the force of the forward moving vehicle occupant is transmitted through the belt webbing 14b to the D-ring 24b. The D-ring 24b moves relative to the mounting bolt 80b upon application to the energy absorber 32b of a load sufficient to cause operation of the energy absorber.

The arms 60b and 62b of the D-ring 24b deform upward as viewed in FIGS. 6 and 7, as the D-ring moves downward relative to the mounting bolt 80b. The bolt 80b moves into the upper end portion 54b of the mounting slot 50b.

The D-ring 24b moves relative to the switch 40b. Upon the initial movement of the D-ring 24b, the actuator surface 122 on the D-ring engages the actuating arm 66b on the switch 40b. The switch 40b closes, completing the electric circuit illustrated in FIG. 2. The indicator lamp 72 is energized and provides an immediately perceptible visual signal, or indication, that repair or replacement of the energy absorber 32 may be necessary. Further downward movement of the D-ring 24b, as the bolt 80b moves into the upper end portion 54b of the mounting slot 50b, causes the switch 40b to slide downward along the B-pillar 25b so as to avoid damage to the switch.

Figure 8:
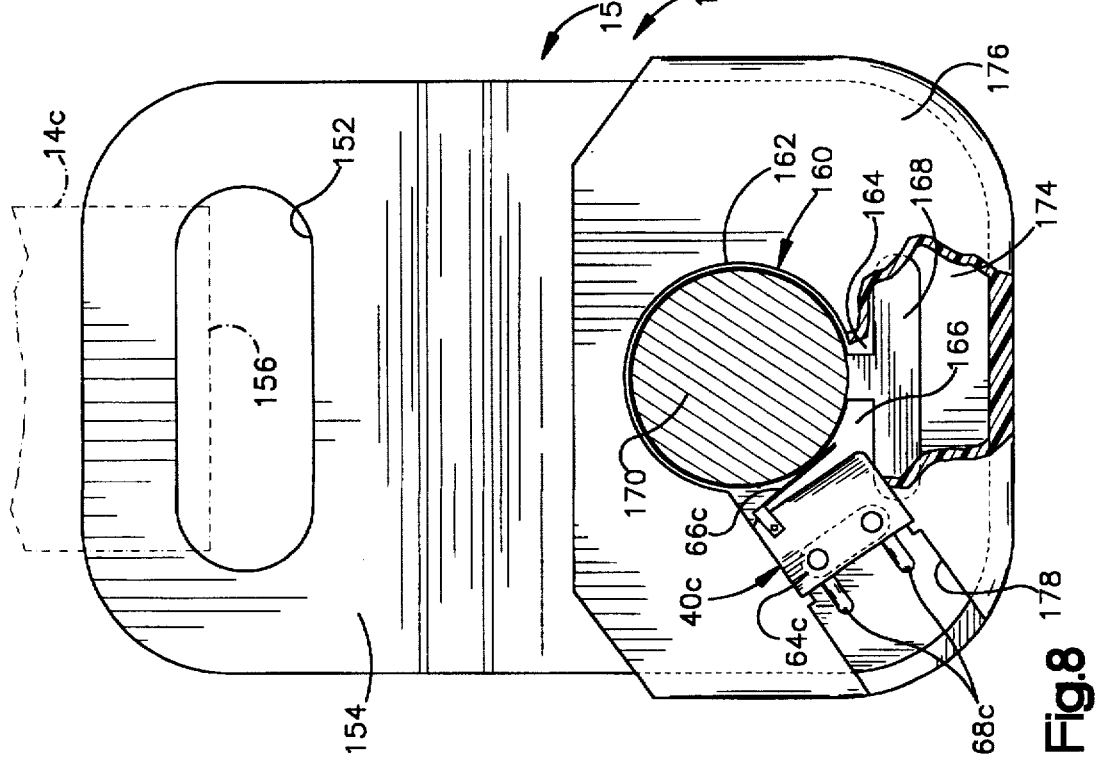
FIG. 8 is an elevational view, partially broken away, of a movable seat belt webbing anchor constructed in accordance with a fourth embodiment of the present invention.

FIG. 8 illustrates an anchor 150 which may be incorporated in a seat belt system 10c similar to the seat belt system 10 (FIGS. 1–3). The seat belt system 10c does not include a movable D-ring. Parts of the seat belt system 10c which are identical or similar to corresponding parts of the seat belt system 10 are given the same reference numeral with the suffix "c" added for clarity. Those parts of the system 10c which are not shown are identical to corresponding parts of the seat belt system 10.

The anchor 150 (FIG. 8) has a generally planar configuration and is preferably made from metal. A webbing slot 152 extends through an upper end portion 154 of the anchor 150. A loop 156 of the belt webbing 14c extends through the slot 152 to secure the end of the belt webbing to the anchor 150 in a force-transmitting relationship. The belt webbing loop 156 is covered by a rigid sleeve (not shown) to support a buckle such as the buckle 26 (FIG. 1) at a location above the anchor 150.

A mounting slot 160 in the anchor 150 has a generally circular upper end portion 162. A pair of cantilevered arms 164 and 166 are located between the upper end portion 162 of the mounting slot 160 and a lower end portion 168 of the mounting slot.

The anchor 150 is supported on a mounting bolt 170. The bolt 170 is fixedly secured to a portion (not shown) of the vehicle, such as the frame of the seat 12, so that the anchor 150 has a generally vertical orientation in the vehicle. The bolt 170 is received in the circular upper end portion 162 of the mounting slot 160 in the anchor 150. The cantilevered arms 164 and 166 of the anchor 150 engage the mounting bolt 170 and resist movement of the bolt out of the upper end portion 162 of the mounting slot 160 in the anchor.

A switch 40c is mounted on the anchor 150, at a location adjacent to the mounting slot 160 in the anchor. The switch 40c is fixed for movement with the anchor 150. The actuating arm 66c of the switch 40c is in engagement with the mounting bolt 170.

A lower end portion 174 of the anchor 150 is preferably encased in a plastic covering 176. The plastic covering 176 includes portions which secure the switch 40c in position on the anchor 150c. An opening 178 in the plastic covering 176 enables electrical connection of the terminals 68c of the switch 40c with the electric circuitry of the vehicle.

The arms 164 and 166 of the anchor 150 are deformable, under a predetermined load, to enable the bolt 170 to move out of the upper end portion 162 of the mounting slot 160 in the anchor. This load is experienced at the design load of the energy absorber 32 of the seat belt system 10c. When the energy absorber 32 is actuated, the force of the forward moving vehicle occupant is transmitted through the belt webbing 14c to the anchor 150. The anchor 150 moves relative to the mounting bolt 170 upon application to the energy absorber 32 of a load sufficient to cause operation of the energy absorber.

Specifically, the load from the belt webbing 14c is transmitted through the upper end portion 154 of the anchor 150 to the lower end portion 174 of the anchor. The lower end portion 174 of the anchor 150 is pulled upward under the applied load. The arms 164 and 166 of the anchor 150 deform by bending downward as viewed in FIG. 8, as the anchor moves upward relative to the mounting bolt 170. The bolt 170 moves into the lower end portion 168 of the mounting slot 160.

The switch 40c moves with the anchor 150 relative to the bolt 170. The actuating arm 66c on the switch 40c pivots relative to the body portion 64c of the switch. The switch 40c closes, completing the electric circuit illustrated in FIG. 2. The indicator lamp 72 is energized and provides an immediately perceptible visual signal, or indication, that repair or replacement of the energy absorber 32c may be necessary.

Figure 9:
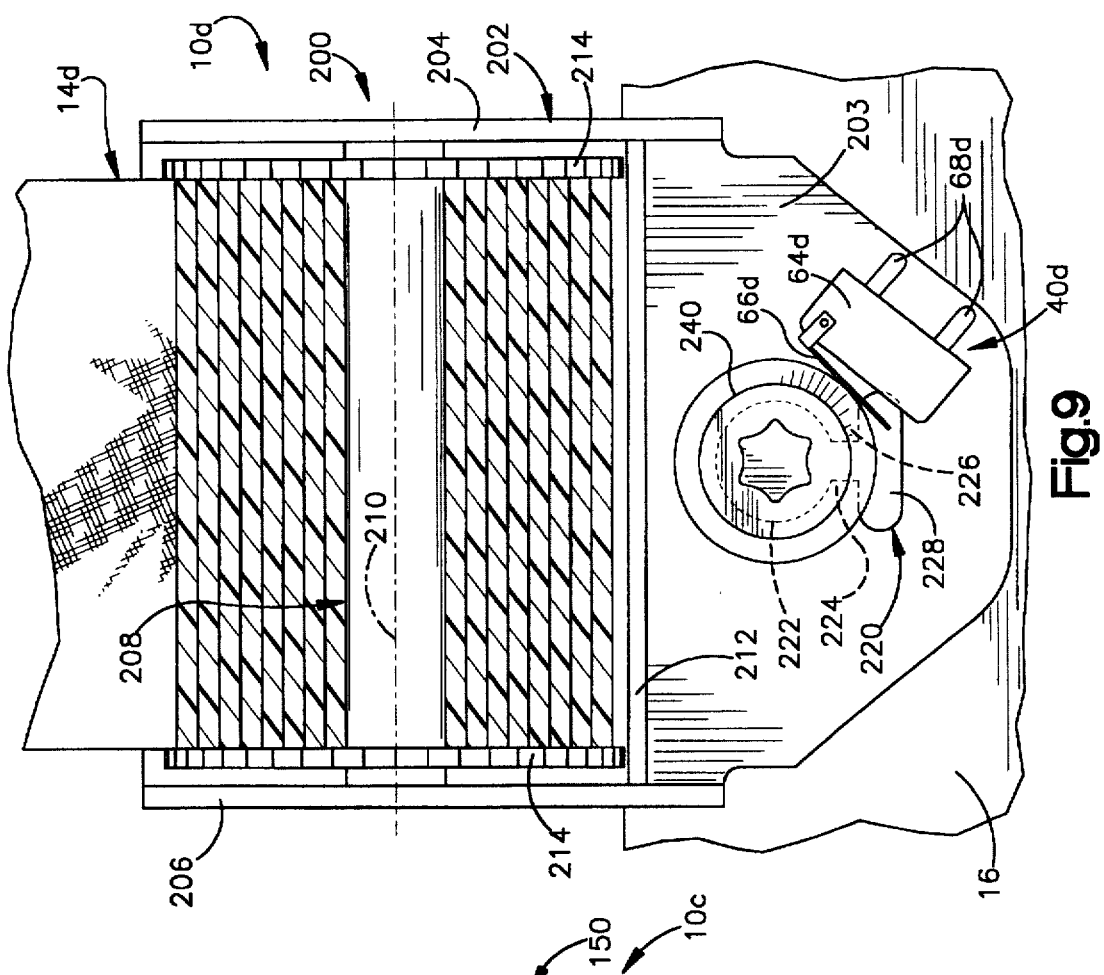
FIG. 9 is an elevational view of a movable seat belt webbing retractor constructed in accordance with a fifth embodiment of the present invention.

FIG. 9 illustrates a retractor 200 which is part of a seat belt system 10d similar to the seat belt system 10 (FIGS. 1–3). The seat belt system 10d does not include a movable D-ring. Parts of the seat belt system 10d which are identical or similar to corresponding parts of the seat belt system 10 are given the same reference numeral with the suffix "d" added for clarity. Those parts of the system 10d which are not shown are identical to corresponding parts of the seat belt system 10.

The retractor 200 (FIG. 9) includes a frame 202 which is a single piece of sheet metal stamped and formed to a U-shaped configuration. The frame 202 includes a back wall 203 and spaced, parallel, side walls 204 and 206 which extend generally perpendicular to the back wall. A belt webbing spool 208 on which the seat belt webbing 14d is wound is supported on the side walls 204 and 206 of the retractor 200 for rotation about an axis 210. A pair of spool locking ratchet wheels 214 are rotatable with the spool 208. A lock pawl 212 is movable in a known manner into engagement with the spool locking ratchet wheels 214 to block withdrawal of belt webbing 14d from the retractor 200.

A mounting slot 220 in the back wall 203 of the retractor frame 202 has a generally circular upper end portion 222. A pair of cantilevered arms 224 and 226 define a lower end portion 228 of the mounting slot 220. A mounting bolt 240 is fixedly secured to a portion of the vehicle body 16. The bolt 240 is received in the circular upper end portion 222 of the mounting slot 220 in the retractor frame 202. The cantilevered arms 224 and 226 of the retractor frame 202 engage the mounting bolt 240 and resist movement of the bolt out of the upper end portion 222 of the mounting slot 220 in the retractor frame 202.

The switch 40d is mounted on the retractor frame 202 at a location adjacent to the mounting slot 250 in the retractor frame 202. The switch 40d is fixed for movement with the retractor frame 202. The actuating arm 66d of the switch 40d is in engagement with the mounting bolt 240.

The arms 224 and 226 of the retractor frame 202 are deformable, under a predetermined load, to enable the bolt 240 to move out of the upper end portion 222 of the mounting slot 220 in the retractor frame 202. This load is experienced at the design load of the energy absorber 32 (not shown) of the seat belt system 10d. When the retractor 200 is locked and the energy absorber 32 is actuated, the force of the forward moving vehicle occupant is transmitted through the belt webbing 14d to the retractor frame 202. The retractor frame 202 moves relative to the mounting bolt 240 upon application to the energy absorber 32 of a load sufficient to cause operation of the energy absorber.

Specifically, the load from the belt webbing 14d is transmitted through the spool 208 into the retractor frame 202. The retractor 200 tends to move upward under the applied load. The arms 224 and 226 of the retractor frame 202 deform by bending downward as viewed in FIG. 8, as the retractor frame moves upward relative to the mounting bolt 240. The bolt 240 moves into the lower end portion 228 of the mounting slot 220.

The switch 40d moves with the retractor 200 relative to the bolt 240. The actuating arm 66d on the switch 40d pivots relative to the body portion 64d of the switch. The switch 40d closes, completing the electric circuit illustrated in FIG. 2. The indicator lamp 72 (FIG. 2) is energized and provides an immediately perceptible visual signal, or indication, that repair or replacement of the energy absorber 32 may be necessary.

Figure 10:
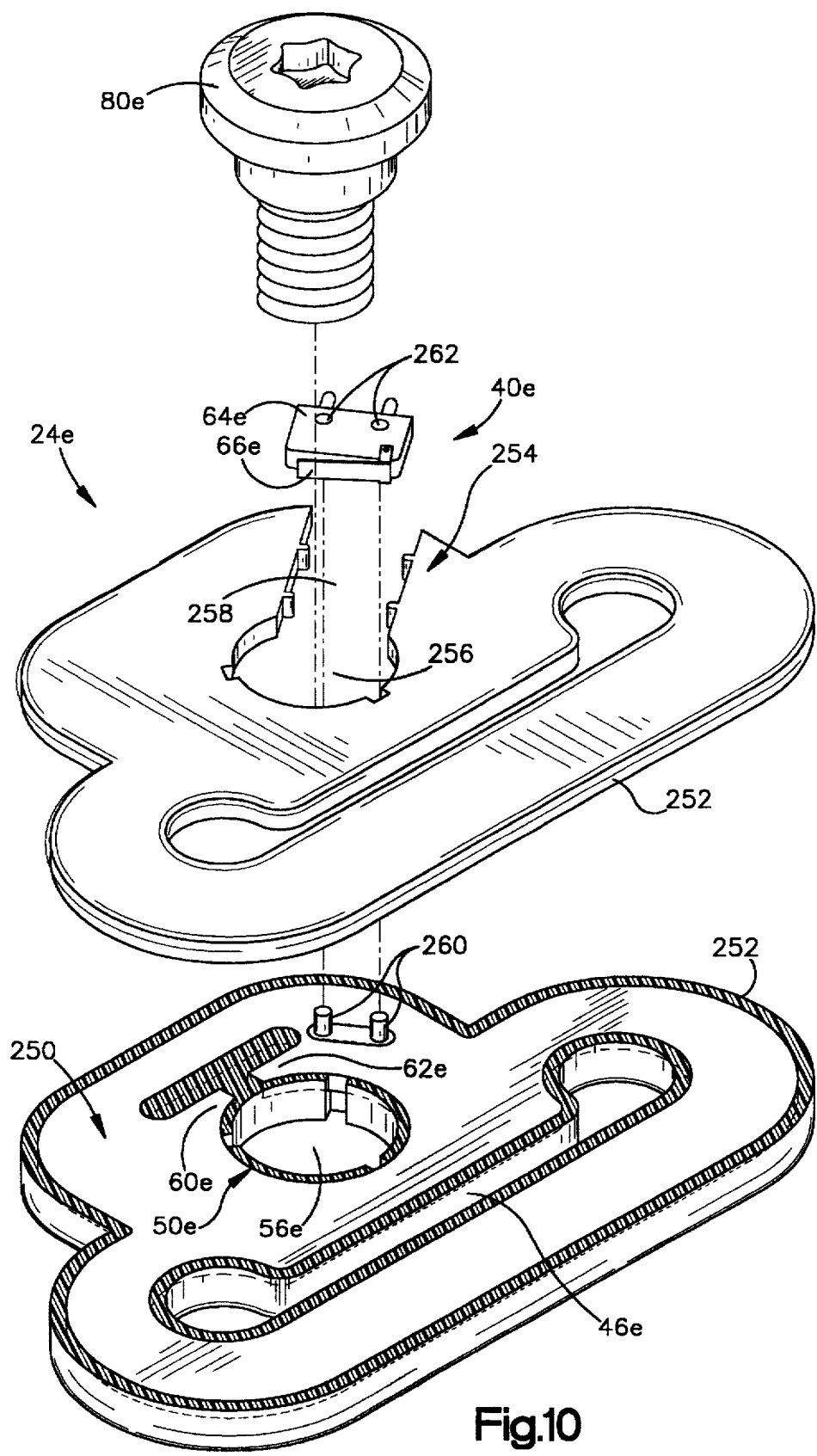
FIG. 10 is an exploded perspective view of a movable D-ring constructed in accordance with a sixth embodiment of the present invention.

FIG. 10 illustrates a D-ring 24e which is similar in configuration to, but smaller than, the D-ring 24a (FIGS. 4-5). The D-ring 24e (FIG. 10) includes a metal base 250 with a plastic covering 252. An opening 254 in the plastic covering 252 includes a first, generally circular, portion 256 into which a mounting bolt 80e can be inserted. A second, rectangular, portion 258 of the opening 250 receives an electric switch 40e. The switch 40e is mounted within the plane of the plastic covering material 252 of the D-ring 24e. A pair of support posts 260 extend through openings 262 in the switch 40e to position the switch on the D-ring base 250.

The actuating arm 66e on the switch 40e is adjacent to the circular portion 256 of the opening 254 and, thus, to the mounting bolt 80e. Cantilevered arms 60e and 62e of the D-ring base 250 engage the mounting bolt 80e and resist movement of the bolt out of a lower end portion 56e of the mounting slot 50e in the D-ring.

When the energy absorber 32 (not shown) of the seat belt system 10e is actuated, the D-ring 24e moves relative to the mounting bolt 80e. The actuating arm 66e on the switch 40e engages the bolt 80e. The switch 40e closes, completing the electric circuit illustrated in FIG. 2. The indicator lamp 72 (FIG. 2) is energized and provides an immediately perceptible visual signal, or indication, that repair or replacement of the energy absorber 32e may be necessary.

FIGS. 11-13 illustrate portions of a vehicle seat belt system 10f which is generally similar to the system 10 (FIGS. 1-3). The system 10f differs from the system 10 by providing a mechanical (rather than electrical) indication, in response to D-ring movement, of the operation of an energy absorber.

The seat belt system 10f includes a D-ring 24f supported on a mounting bolt 80f. The bolt 80f is fixedly secured to the vehicle B-pillar 25. An actuator tab 300, formed as a part of the B-pillar 25, projects from the B-pillar at a location below the mounting bolt 80f. The actuator tab 300 includes a first portion 302 which extends perpendicularly from the B-pillar 25 and a second portion 304 which extends upward at about a 45° angle to the first portion. The actuator tab 300 extends through an opening 306 in the D-ring 24f.

The mounting bolt 80f extends through a vertically elongate mounting slot 50f in the D-ring 24f. The bolt 80f (FIG. 11) is initially disposed in a lower portion of the mounting slot 50f. Deformable portions (not shown) of the D-ring 24f, similar to the deformable D-ring portions 60a and 62a (FIGS. 4-5), resist downward movement of the D-ring relative to the bolt 80f.

A plastic cover 310 substantially covers the D-ring 24f. The cover 310 has a mounting portion 312 which includes a base wall 314 extending parallel to the B-pillar 25. A cylindrical boss 316 extends from the base wall 314 in a direction toward the B-pillar 25. The boss 316 receives a cylindrical central portion 84f of the mounting bolt 80f. The mounting portion 312 of the cover 310 is fixed in position relative to the mounting bolt 80f.

A movable portion 320 of the cover 310 is connected by a hinge portion 322 to the base wall 314 of the cover. The movable portion 320 of the cover 310 includes an upper wall 324 which extends from the base wall 314 in a direction away from the B-pillar 25. An outer wall 326 extends downward from the upper wall 324 into engagement with the D-ring 24f at a location below the actuator tab 300. A lower wall 330 of the cover 310 extends inward from the outer wall 326 of the cover at a location above the actuator tab 300. The lower wall 330 extends through the opening 306 in the D-ring 24f and under a portion 332 of the D-ring. An end portion 334 of the lower wall 330 of the cover 310 is clamped between the D-ring portion 332 and the B-pillar 25.

A rib 340 on the cover 310 extends downward from the lower wall 330. The rib 340 is disposed outward of the second portion 304 of the actuator tab 300 on the B-pillar 25. The actuator tab 304 on the B-pillar 25 engages the lower wall 330 of the cover 310 at the root of the rib 340.

Upon actuation of the energy absorber 32f of the seat belt system 10f, the force of the forward moving vehicle occupant is transmitted through the belt webbing 14f into the D-ring 24f. The D-ring 24f moves downward relative to the mounting bolt 80f. The moving D-ring portion 332 forces the end portion 334 of the lower wall 330 of the cover 310 downward. At the same time, the engagement of the actuator arm 300 of the B-pillar 25f with the rib 340 of the cover 310 causes the lower wall 330 of the cover to bend under the force of the moving D-ring 24f.

As the lower wall 330 of the cover 310 bends, the end portion 334 of the lower wall 330 of the cover 310 moves out from behind the portion 332 of the D-ring 24f. The movable portion 320 of the cover 24f pivots outward from the position shown in FIG. 11, through the position shown in FIG. 12, to the position shown in FIG. 13. In this latter position of the cover 310, a substantial portion of the D-ring 24f is exposed, providing an immediately perceptible visual indication that the D-ring 24f has moved and, thus, that the energy absorber 32f has been actuated.

From the above description of the invention, those skilled in the art will perceive improvements, changes and modifications in the invention. Such improvements, changes and modifications within the skill of the art are intended to be covered by the appended claims.

Having described the invention, I claim:

1. A vehicle occupant safety apparatus comprising:
   a length of seat belt webbing extensible about a vehicle occupant for helping to restrain the vehicle occupant;
   an energy absorber connected with said belt webbing, said energy absorber being actuatable in response to a tensile load on said belt webbing exceeding a predetermined load indicative of a vehicle collision;
   a D-ring having a webbing opening through which said belt webbing extends;
   means for supporting said D-ring for movement from a first position to a second position upon actuation of said energy absorber; and
   signalling means actuatable in response to movement of said D-ring from the first position to the second position for providing a signal perceptible to the vehicle occupant and indicative of actuation of said energy absorber.

2. An apparatus as set forth in claim 1 wherein said D-ring has a mounting opening through which a D-ring mounting bolt is extensible, said D-ring having deformable portions which at least partially define said mounting opening, said D-ring being movable relative to the mounting bolt in response to the tensile load on said belt webbing exceeding the predetermined load, said deformable portions of said D-ring deforming upon movement of said D-ring relative to said mounting bolt.

3. An apparatus as set forth in claim 2 wherein said opening is key hole shaped.

4. An apparatus as set forth in claim 2 wherein said deformable portions of said D-ring are cantilevered arms.

5. An apparatus as set forth in claim 1 wherein said signalling means for providing a signal comprises an electric circuit including:

an electric switch which is actuated in response to movement of said D-ring from the first position to the second position, and a signal device which is energized in response to the actuation of said electric switch to provide the signal perceptible to the vehicle occupant.

6. An apparatus as set forth in claim 5 wherein said signal device is a lamp.

7. An apparatus as set forth in claim 5 wherein said D-ring is supported on a mounting bolt and said switch is actuated by contact with the mounting bolt.

8. An apparatus as set forth in claim 1 wherein said switch is movable with said D-ring upon movement of said D-ring from the first position to the second position.

9. An apparatus as set forth in claim 1 wherein said D-ring moves relative to said switch upon movement of said D-ring from the first position to the second position.

10. An apparatus as set forth in claim 1 wherein said signalling means for providing a signal comprises a cover which moves from a first position substantially covering said D-ring to a second position exposing a substantial portion of said D-ring upon movement of said D-ring from the first position to the second position.

11. A vehicle occupant safety apparatus for installation on a body of a vehicle, said apparatus comprising:

a length of seat belt webbing extensible about a vehicle occupant for helping to restrain the vehicle occupant;

a force-transmitting member engaging said belt webbing for transmitting force from said belt webbing to the vehicle body;

means for supporting said force-transmitting member for movement from a first position to a second position in response to a tensile force on said belt webbing exceeding a predetermined force indicative of a vehicle collision; and electric signalling means actuatable in response to movement of said force-transmitting member from the first position to the second position for providing a signal perceptible to the vehicle occupant and indicative of the tensile force on said belt webbing exceeding the predetermined force.

12. An apparatus as set forth in claim 11 wherein said force-transmitting member is a D-ring.

13. An apparatus as set forth in claim 11 wherein said force-transmitting member is an anchor.

14. An apparatus as set forth in claim 11 wherein said force-transmitting member is a retractor.

15. An apparatus as set forth in claim 11 wherein said electric signalling means comprises an electric circuit including:

an electric switch which is actuated in response to movement of said D-ring from the first position to the second position, and a signal device which is energized in response to the actuation of said electric switch to provide the signal perceptible to the vehicle occupant.

16. An apparatus as set forth in claim 11 further comprising an energy absorber connected with said belt webbing, said energy absorber being actuatable in response to the tensile force on said belt webbing exceeding the predetermined force, said signal perceptible to the vehicle occupant being indicative of actuation of said energy absorber.

* * * * *